(12) United States Patent
Suzuki et al.

(10) Patent No.: US 6,276,836 B1
(45) Date of Patent: Aug. 21, 2001

(54) CAGE FOR RADIAL BALL BEARING

(75) Inventors: Hironori Suzuki; Shigeki Maehara, both of Fujisawa; Shouji Yanagawa, Kanagawa-ken, all of (JP)

(73) Assignees: NSK Ltd., Tokyo; Kabushikigaisha Takaiseiki, Fujisawa, both of (JP)

(*) Notice: Subject to any disclaimer, the term of this patent is extended or adjusted under 35 U.S.C. 154(b) by 0 days.

(21) Appl. No.: 08/998,778

(22) Filed: Dec. 29, 1997

(30) Foreign Application Priority Data

Dec. 27, 1996 (JP) .................................................. 8-349690
Dec. 5, 1997 (JP) .................................................. 9-335304

(51) Int. Cl.[7] .................................................. F16C 33/38
(52) U.S. Cl. ........................ 384/531; 384/523; 384/527
(58) Field of Search .................................... 384/531, 532, 384/523, 524, 527, 526, 528, 529, 530, 533

(56) References Cited

U.S. PATENT DOCUMENTS

| 1,814,993 | * | 7/1931 | Wickland | 384/531 |
|---|---|---|---|---|
| 1,915,288 | * | 6/1933 | Bott | 384/531 |
| 4,451,098 | | 5/1984 | Farley et al. . | |
| 4,941,759 | * | 7/1990 | Dreschmann et al. | 384/531 |
| 4,963,040 | * | 10/1990 | Takebayashi et al. | 384/531 X |
| 5,180,231 | * | 1/1993 | Ueno et al. | 384/527 |
| 5,539,844 | * | 7/1996 | Tazumi et al. | 384/531 |

FOREIGN PATENT DOCUMENTS

| 488166 | 5/1937 | (GB) . |
|---|---|---|
| 2 132 287 | 7/1984 | (GB) . |
| 2 243 416 | 4/1990 | (GB) . |

* cited by examiner

Primary Examiner—David A. Bucci
Assistant Examiner—Colby Hansen
(74) Attorney, Agent, or Firm—Crowell & Moring, L.L.P.

(57) ABSTRACT

A cage for a radial ball bearing formed generally in an annular shape and provided with a plurality of pockets with openings arranged in a circumferential direction to rotatably hold a plurality of balls adapted to rotate around a rolling central axis in the pockets, each of the pockets having an inner surface portion which includes a peripheral edge portions along the opening on the peripheral surfaces of the cage and is formed with an axial cylindrical surface having a central axis placed in the rolling central axis of the ball.

3 Claims, 7 Drawing Sheets

CAGE FOR RADIAL BALL BEARING

FIELD OF THE INVENTION

The present invention is related to a cage for the radial ball bearing which is used in various rotatable machines and apparatus, particularly to a contact portion between the cage and balls where sufficient lubrication is secured to reduce the vibration and noise in the ball bearing.

DESCRIPTION OF THE BACKGROUND

A ball bearing as shown in FIG. 6 is widely used in the art so as to support various rotatable portions such as bearing portions of the various rotatable machines and apparatus. This ball bearing comprises an inner ring 2 having an outer peripheral surface on which an inner ring raceway 1 is formed, an outer ring 4 having an inner peripheral surface on which an outer ring raceway 3 is formed, with the inner and outer rings 2, 4 being concentrically arranged, a plurality of balls 5 rotatably disposed between the inner and outer ring raceways 1, 3, and a cage 6 having a plurality of pockets 8 for rotatably accommodating the balls 5, respectively.

In the case illustrated, the inner and outer ring raceways 1, 3 are of a deep groove type.

The cage 6 of the ball bearing illustrated in FIG. 6, which is referred to as wave shaped or corrugated press cage, is made of a metal plate member by press-forming, and comprised of a pair of elements 9a, 9b each formed in a wave-like or corrugated annular shape and combined together. Specifically, the element 9a is formed with recessed portions 8a arranged in a circumferential direction, while the element 9b is formed with recessed portions 8b arranged in a circumferential direction, and the recessed portions 8a, 8b cooperate to form the pockets 8. Disposed circumferentially between the recessed portions 8a, 8b are connecting portions, and the rating connecting portions are placed in contact with each other and fixed with a rivet 10, so that the cage 6 is formed in an annular shape to have the pockets 8 arranged in a circumferential direction.

The recessed portions 8a, 8b have an inner surface the intermediate portion of which forms a spherically concave portion 11 which has a radius of curvature slightly larger than the radius of curvature of the balls 5. Accordingly, the pair of elements 9a, 9b are abutted with each other to combine the recessed portions 8a, 8b to form the pockets 8.

The cage 6 illustrated in FIG. 7, which is referred to as crown shaped cage, comprises an annular main portion 7 made of a synthetic resin etc., and formed with a plurality of pockets 8 arranged in a circumferential direction for rotatably holding balls 5 (see FIG. 6), respectively.

In the case of crown type cage 6, the main portion 7 is formed with pairs of resilient projections 12, each pair of resilient projections 12 spaced apart from each other and having a concave side surface portion, respectively, with a spherical concave surface portion 13 therebetween, so that the concave side surface portions of the pair of the resilient projections 12 are opposed to each other. Each of the pockets 8 is defined by the pair of the concave side surface portions and the spherical concave surface portion 13 therebetween. The spherical concave surface portion 13 has a radius of curvature slightly larger than the radius of curvature of the outer surface of the balls 5.

Incidentally, the spherical concave surface portion 13 is faced in an axial direction of the bearing. The term "axial" means an up and down direction in FIG. 7, and the spherical concave surface portion 13 is faced upwards in FIG. 7.

When assembling the ball bearing, forcing the balls 5 into the pockets 8, respectively, through the space between the tip end edges of the pair of the resilient projections 12 which are resiliently pushed away, so that the space between the tip and edges of the pair of the resilient projections 12 is enlarged.

Thus, the balls 5 are nested in the pockets 8, respectively, and supported by the cage 6 between the inner ring raceway 1 and the outer ring raceway 3 (see FIG. 6).

During use of the ball bearing provided with the cage 6, the inner ring 2 and the outer ring 4 are relatively rotated due to the rotating balls 5, which spin around the inner ring 2. The cage 6 is rotated around the inner ring 2 with the same speed to the spinning speed of the balls 5.

Lubricant such as grease is filled in or supplied continuously to a portion between the outer peripheral surface of the inner ring 2 and the inner peripheral surface of the outer ring 4 so that the relative rotation as mentioned above is made smoothly, avoiding vibration and noise and preventing failures such as seizure in the ball bearing.

The ball bearing may be provided with a sealing member such as seal plate and shield plate to close the openings at the both ends of the space between the outer peripheral surface of the inner ring 2 and the inner peripheral surface of the outer ring 4, so that the lubricant is prevented from leaking out of the space, and any foreign matter such as dust is prevented from penetrating into the space, although FIG. 6 shows a ball bearing which is not provided with such a seal member.

The ball bearing having such a cage 6 installed therein occasionally experiences vibration and noise referred to as "cage noise" due to the vibrations caused in the cage 6 even when a necessary amount of lubricant is filled in or supplied to it. Such vibrations in the cage 6 are caused based on the sliding friction between the balls 5 and the cage 6 due to the relatively large amount of movements of the cage 6 with reference to the balls 5.

In order to prevent the cage noise from occurring, conventionally the clearance between the inner surface of the pockets 8 and the rolling surface of the balls 5 is made small to minimize the movement amount of the cage 6 with reference to the balls 5, so that the occurrence of the cage noise is refrained.

However, only with minimizing the movement amount of the cage 6 with reference to the balls 5, the cage noise are still produced due to the shape of the inner peripheral surface of the pockets 8 of the cage 6. The reason is explained referring to FIG. 8 and 9 as follows.

The pockets 8 of the cage 6 have peripheral edge portions 14 along the opposite openings, which have a sharp corner portion 15 having a large curvature which is reluctant to the flow of the lubricant.

It will be noted that it is difficult for the lubricant to enter into the clearance 16 between the inner surface of the pockets 8 and the rolling surface of the balls 5 when the clearance 16 is made small so as to refrain the cage noise. Specifically, the lubricant, when entering the clearance from the surrounding space as the balls 5 rotate, is scraped by the corner portions 15 and thus prevented from entering the clearance 16. Consequently, an insufficient amount of lubricant is supplied to the interior of the clearance 16, the friction and vibration in the sliding contact portions between the cage 6 and the balls 5 are not sufficiently refrained, thus vibration and noise are produced.

On the other hand, conventionally, there are cages having pockets the inner surface of which is formed in a radial cylindrical shape, not spherical, with its central axis placed in the radial axis of the cage. In the case of the cage having the pockets with the radial cylindrical inner peripheral surface, the lubricant attached to the rolling surfaces of the balls is not scraped by the peripheral edge portions along the openings of the pockets, the friction vibration is prevented from occurring in the sliding contact portion between the cage and the balls. However, the lubricant may be excessively taken in the pockets. As the excessive amount of lubricant exists in the pockets, the resistance against the rolling balls in the pockets is larger, so that the rotating torque of the radial bearing with the cage installed therein is larger.

In the case of the miniature bearings used for the radial bearings to be installed in the rotatable support portions of the compact motors etc., the increase of the rotating torque may seriously affect the performance such as cell life, wow flutter etc. of the devices having the compact motor installed therein. Therefore, still improvements are required.

SUMMARY OF THE INVENTION

One object of the invention is to provide an improvement of the cage for the radial ball bearings.

Another object of the present invention is to provide a cage for the radial ball bearing the pocket inner surface of which is formed to optimize the clearance between the inner surface and the rolling surface of the ball in the pocket to achieve optimum lubrication.

Figure 5A:
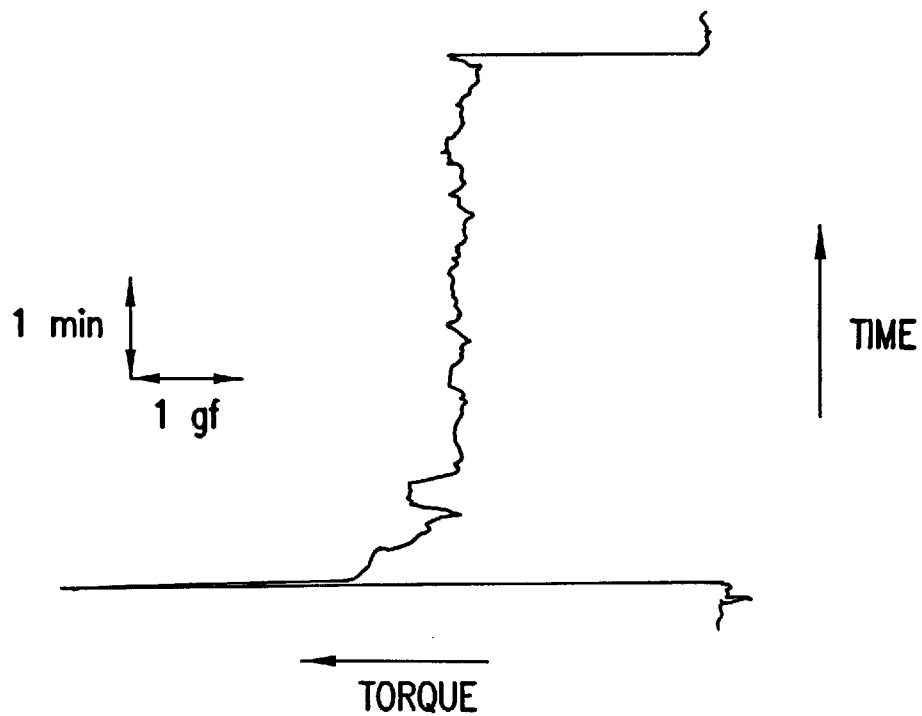
Figure 5B:
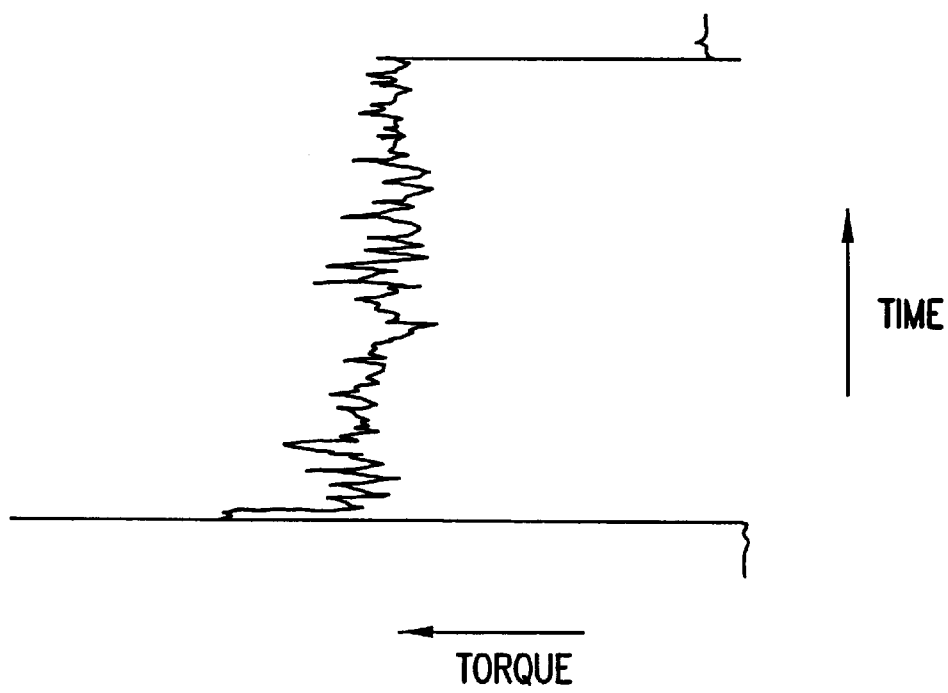

FIGS. 5(A) and 5(B) are a bearing torque diagram showing a result of experiments carried out to confirm the effects of the present invention.

Figure 6:
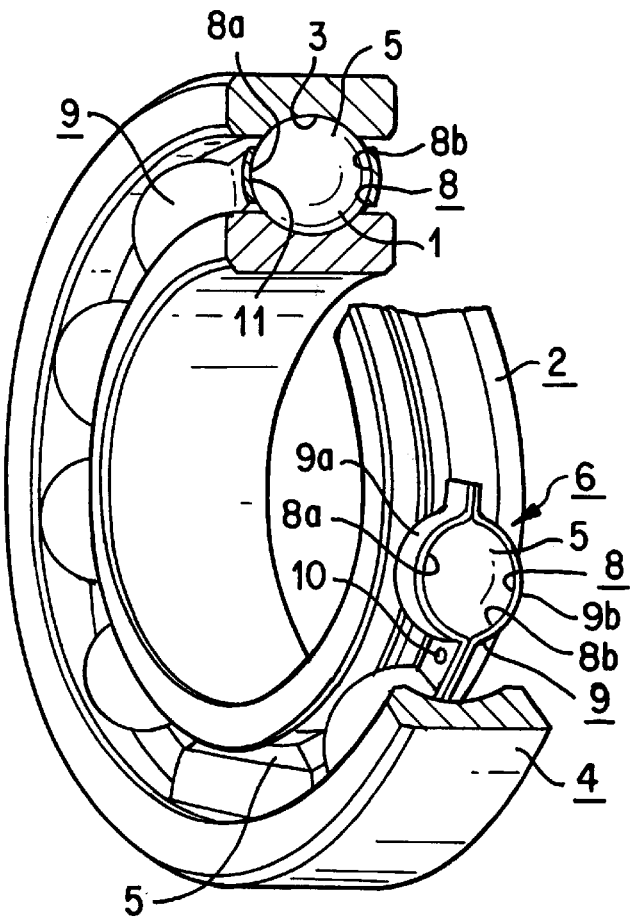

FIG. 6 is a partly cut away, perspective view of an example of the ball bearing with a conventional cage installed therein.

Figure 7:
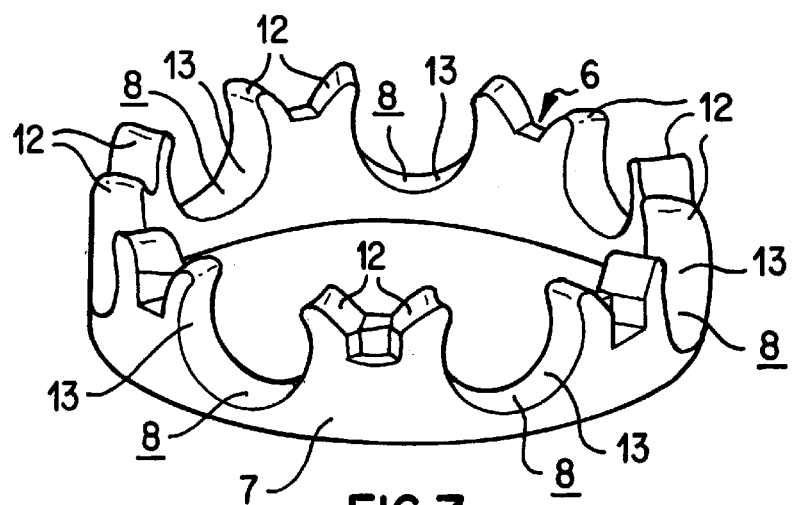

FIG. 7 is a perspective view of another example of the conventional cage.

Figure 8:
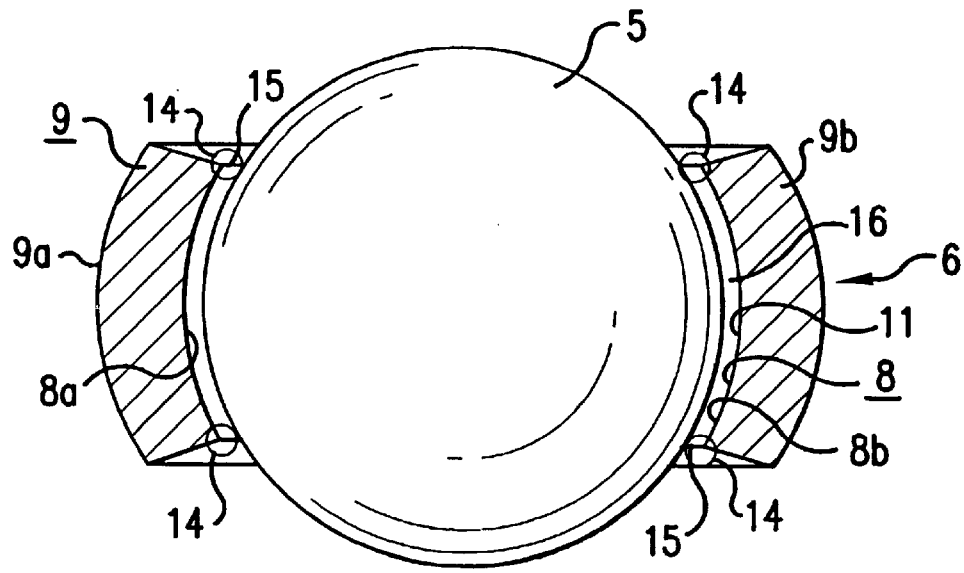

FIG. 8 is an enlarged cross sectional view of a portion of the cage of FIG. 6 where a ball is held in the cage.

Figure 9:
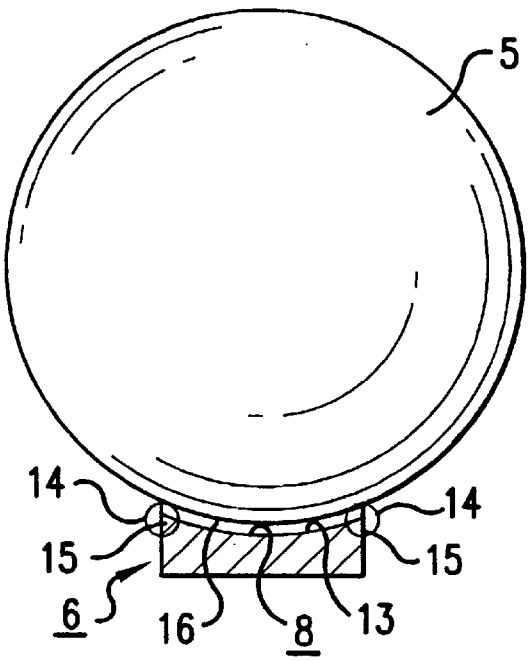

FIG. 9 is an enlarged cross sectional view of a portion of the cage of FIG. 7 where a ball is held in the cage.

DETAILED DESCRIPTION OF THE PREFERRED EMBODIMENTS OF THE INVENTION

Figure 1:
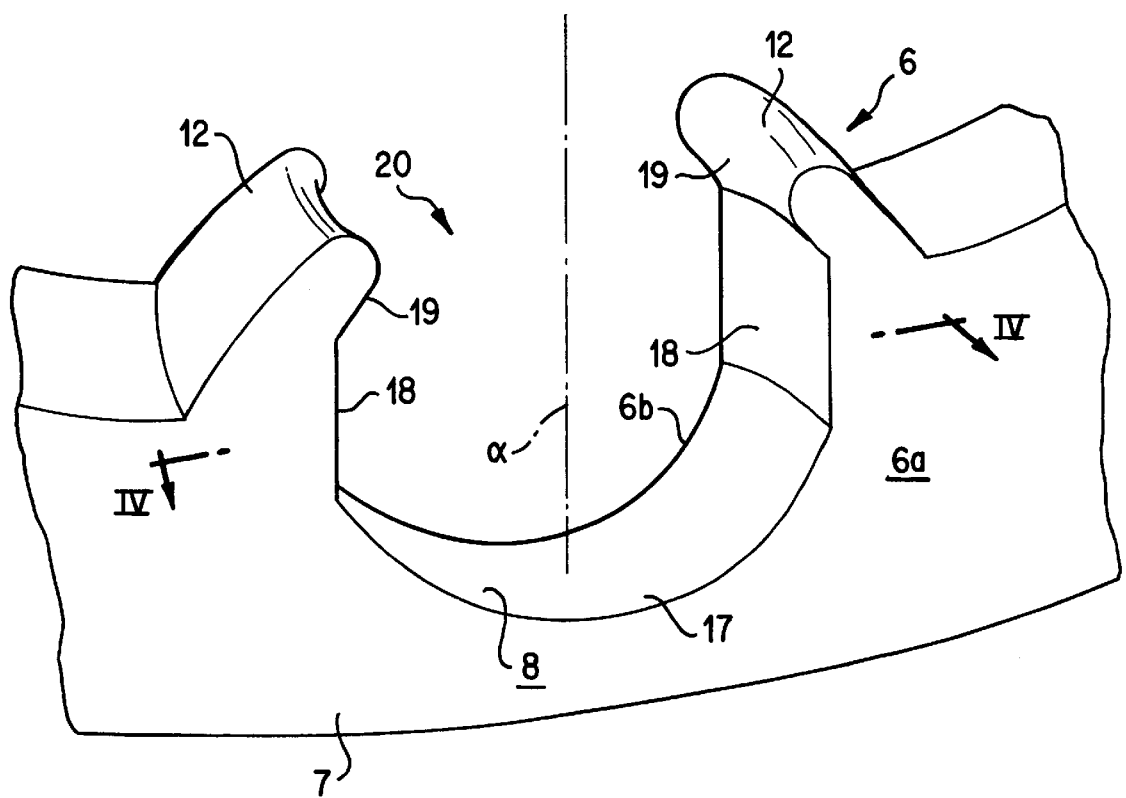
FIG. 1 is an enlarged perspective partial view of a portion of the cage in one example of the embodiments according to the present invention.

FIG. 1 shows an example of the embodiments of the present invention, which is applied to a crown type of cage 6 as illustrated in FIG. 7. The cage 6 has a plurality of openings on either side to define a plurality of pockets 8. Only one of the pockets 8 of the cage 6 is illustrated in FIG. 1

The cage 6 for the radial ball bearing of the present invention is formed in a generally annular shape with outer and inner peripheral surfaces 6a, 6b and has a main portion 7 in which the pockets 8 are arranged in a circumferential direction to rotatable hold balls 5, respectively, as in the conventional cage for the radial ball bearing.

The pockets 8 have an inner surface which includes opposed axial cylindrical surface portions 18 having the central axis placed in the rolling central axis α of the ball 5 held in each pocket 8.

Peripheral edge portions are formed between the inner surface of the pockets 8 and the outer and inner peripheral surfaces 6a, 6b of the cage 6 along the openings.

In the present invention, the inner shape of the pockets 8 is tailored, so that the clearance 16 (look at FIGS. 8 and 9) is formed between the inner surface of the pockets 8 and the rolling surface of the balls 5 (FIGS. 2, 4, 6, 8, 9 ) is filled with a necessary amount of lubricant such as grease.

The construction and function of the other parts are substantially the same as those of the conventional one as previously mentioned, and not detailed hereinafter. The following is a detailed description of the feature of the present invention.

The pockets 8 provided on an axial side face of the annular main portion 7 has an inner surface where a first spherical concave surface portion 17 is provided at a circumferentially mid portion. This first spherical concave surface portion 17 has a radius of curvature slightly larger than the radius of curvature of the rolling surface of the ball 5 held in the pocket 8.

Formed on the both circumferential sides of the first spherical concave surface portion 17 are a pair of axial cylindrical surface portions 18 one end of which is continued to the end on the both circumferential sides of the first spherical concave surface portion 17.

The central axis of the axial cylindrical surface portion 18 is placed in the rolling central axis α of the ball 5 held in the pocket 8. Specifically, the ball 5 held in the pocket 8 is rotated around the rolling central axis α parallel to the central axis of the main portion 7 corresponding to the relative rotation of the inner ring 2 and the outer ring 4 of the ball bearing (see FIG. 6).

The pair of axial cylindrical surface portions 18 formed in the pocket 8 are located in a single cylindrical shape the central axis of which is placed in the rolling central axis α.

A pair of resilient projections 12 are opposed with each other with a space 20 therebetween, and formed to have a second spherical concave surface portion 19 partly defining the inner surface of the pocket 8. The second spherical concave surface portion 19 may be concentric with the first spherical concave surface 17. In the structure of FIG. 1, however, the center of the second spherical concave surface portion 19 is located on the rolling central axis α at a point different from the central point of the first spherical concave surface portion 17.

The length and shape of the second spherical concave surface portion 19 are controlled with reference to the length of the pair of axial cylindrical surface portions 18, so that the track portion of the ball 5 held in the pocket 8 is not displaced from the pair of axial cylindrical surface portions 18. The track portion of the balls is the portion where the rolling surface of the ball 5 comes into contact with the outer ring raceway 3 and the inner ring raceway 1 during rolling. Accordingly, for example, the first spherical concave surface portion 17 and the second spherical concave surface portions 19 have a radius of curvature slightly larger than the radius of curvature of the rolling surface of the ball 5 and their center placed in the rolling central axis α.

In the case of the cage for radial ball bearing of the present invention constructed as mentioned above, a necessary amount of lubricant such as grease can be taken into the clearance between the inner surface of the pocket 8 and the rolling surface of the ball 5. The reason of this is as follows;

During the relative rotation of the inner ring 2 and the outer ring 4 of the ball bearing, the ball 5 is rotated around the rolling central axis α. The track portion of the ball 5, that is the portion where the rolling surface of the ball 5 comes into contact with the outer ring raceway 3 and the inner ring raceway 1 during rolling (see FIG. 6), exists on the plane including the central point of the ball 5 and being transverse to the rolling central axis α.

In the area corresponding to the axial cylindrical surface portions 18, the distance between the rolling surface of the ball 5 held in the pocket 8 and the axial cylindrical surface portions 18 is small at the portion corresponding to the track portion of the ball 5, and enlarged as it is spaced from the track portion of the ball 5. This is true also with the peripheral edge portion along the openings of the pocket 8.

Accordingly, with respect to the lubricant attached to the rolling surface of the ball 5, a substantial part of the lubricant attached to the track portion of the ball 5 is scraped by the peripheral edge portion along the openings of the pocket 8. Accordingly, an excessive amount of lubricant is prevented from existing between the rolling surface of the ball 5 and the outer ring raceway 3 and inner ring raceway 1, so that the rotating torque (absolute value and variation width) can be reduced in the radial ball bearing having the cage installed therein.

On the other hand, a substantial part of the lubricant attached to a portion of the rolling surface of the ball 5 displaced from the track portion is not scraped by the peripheral edge portion along the openings of the pocket 8 and is taken into the pocket 8. Consequently, the lubricant taken into the pocket 8 improve the lubrication property between the rolling surface of the ball 5 and the inner surface of the pocket 8, to which the prevention of vibration (cage noise) occurrence and the durability of the radial ball bearing having the cage installed therein are attributable.

Figure 2A:
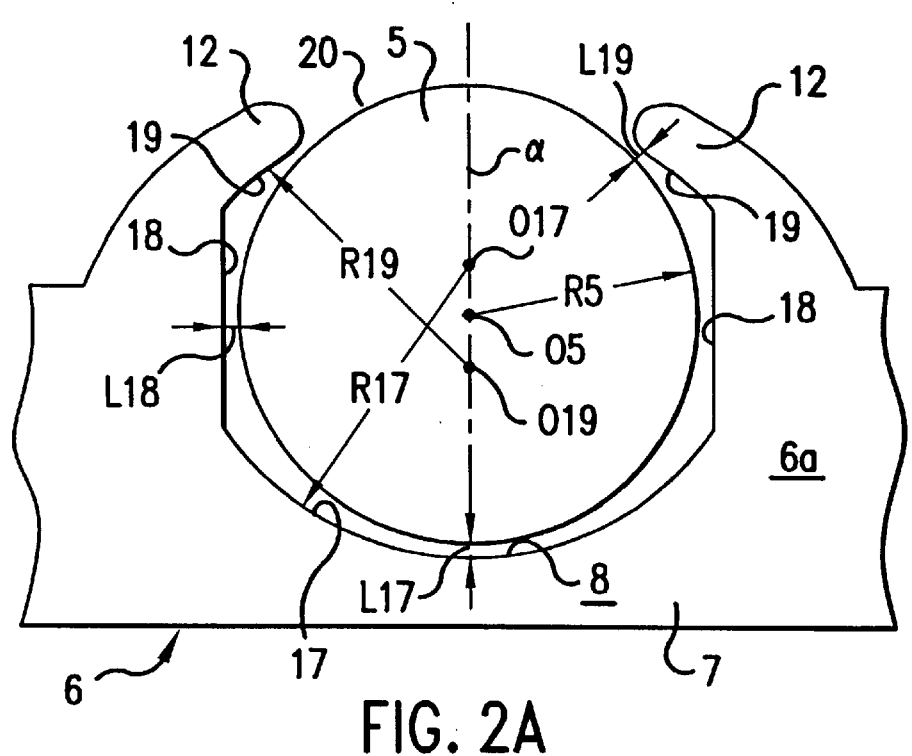
FIG. 2(A) is a diagramatic partial side view of a pocket in the one example viewed in a radial direction of the cage where a ball is held in the pocket, which is more desirable in the present invention.
Figure 2B:
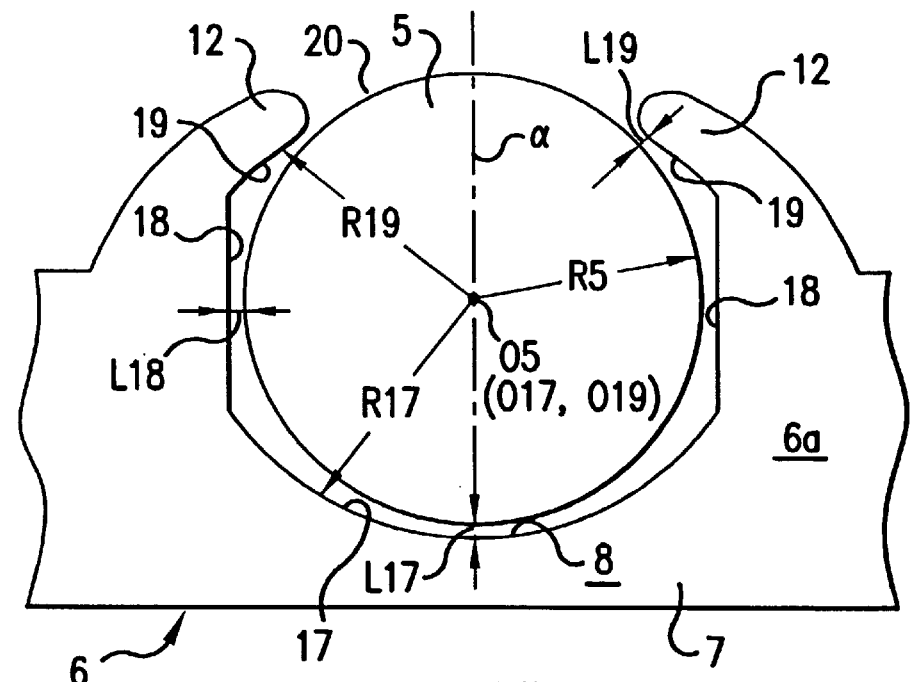
FIG. 2(B) is a diagramatic partial side view of another pocket in the one example viewed in a radial direction of the cage where a ball is held in the pocket, which is a basic shape of the present invention.

Incidentally, the first spherical concave surface portion 17 and the second spherical concave surface portions 19 may be arranged to be concentric with each other, specifically on the same spherical surface, but it is more desirable that the first spherical concave surface portion 17 and the second spherical concave surface portions 19 are arranged to have their center different from each other, so that the cage 6 is prevented from being axially displaced while the lubricant is effectively taken into the pocket 8. This feature is explained referring to FIGS. 2(A) and 2(B) as follows;

In the structure as shown in FIGS. 1 and 2, where the pocket 8 has a pair of axial cylindrical surface portions 18 provided on the both circumferential sides (right and left directions in FIGS. 2(A) and 2(B)), the first spherical concave surface portion 17 is provided to define a portion of the pocket 8 on one side (lower end side in FIGS. 2(A) and 2(B)) in the direction of the rolling central axis α of the ball 5, and the second spherical concave surface portions 19 are provided to define a portion of the pocket 8 on the other side (upper end side in FIGS. 2(A) and 2(B)) in the direction of the rolling central axis α of the ball 5.

In FIG. 2(A), the ball 8 has its center at the point $O_5$ provided that the ball 5 exists at a neutral position in the pocket 8. Under such a condition, the central point $O_{17}$ of the curvature of the first spherical concave surface portion 17 is placed at a position biased to the second spherical concave surface portions 19 from the point $O_5$ of the ball 5 on the rolling central axis α. On the other hand, the central point $O_{19}$ of the curvature of the second spherical concave surface portions 19 is placed at a position biased to the first spherical concave surface portion 17 from the point $O_5$ of the ball 5 on the rolling central axis α. Accordingly, the radius of curvature $R_{17}$ of the first spherical concave surface portion 17 and the radius of curvature $R_{19}$ of the second spherical concave surface portions 19 are outstandingly larger than the radius of curvature $R_5$ of the rolling surface of the ball 5 comparing with the case as shown in FIG. 2(B) where the central points $O_5$, $O_{17}$, $O_{19}$ are coincide with each other.

As in FIG. 2(A), since the central point $O_{17}$ of the curvature of the first spherical concave surface portion 17 is displaced from that $O_{19}$ of the curvature of the second spherical concave surface portions 19, the minimum $L_{17}$ of the distance between the first spherical concave surface portion 17 and the rolling surface of the ball 5, the minimum $L_{19}$ of the distance between the second spherical concave surface portions 19 and the rolling surface of the ball 5, and the minimum $L_{18}$ of the distance between the axial cylindrical surface portions 18 and the rolling surface of the ball 5 can have the substantially same value. Consequently, the cage 6 is prevented from being displaced in an axial direction while the lubricant can be optimally taken into the pocket 8. This feature is explained referring to FIGS. 2(A) and 2(B) as follows;

In FIG. 2(B), where the center of the curvature of the first spherical concave surface portion 17 coincides with the center of the curvature of the second spherical concave surface portions 19, when the minimum $L_{18}$ of the distance between the axial cylindrical surface portions 18 and the rolling surface of the ball 5 is optimized, the minimum $L_{17}$ of the distance between the first spherical concave surface portion 17 and the rolling surface of the ball 5 and the minimum $L_{19}$ of the distance between the second spherical concave surface portions 19 and the rolling surface of the ball 5 become excessively large, so that the moving amount of the cage 6 in an axial direction with reference to the ball 5 become excessively large. Consequently, the cage 6 is inclined to vibrate during operation of the radial ball bearing having the cage 6 installed therein.

On the contrary, when the minimum $L_{17}$ of the distance between the first spherical concave surface portion 17 and the rolling surface of the ball 5 and the minimum $L_{19}$ of the distance between the second spherical concave surface portions 19 and the rolling surface of the ball 5 are optimized, the minimum $L_{18}$ of the distance between the pair of axial cylindrical surface portions 18 and the rolling surface of the ball 5 is excessively small, so that the lubricant attached to the track portion of the rolling surface of the ball 5 is inclined to be scraped by the peripheral edge portions of the axial cylindrical surfaces 18 along the openings by an amount more than necessary, so that the effects of reducing the cage noise are not secured.

On the other hand, in FIG. 2(A), where the center $O_{17}$ of the curvature of the first spherical concave surface portion 17 is displaced from the center $O_{19}$ of the curvature of the second spherical concave surface portions 19, the minimum $L_{17}$ of the distance between the first spherical concave surface portion 17 and the rolling surface of the ball 5, the minimum $L_{19}$ of the distance between the second spherical concave surface portions 19 and the rolling surface of the ball 5, and the minimum $L_{18}$ of the distance between the axial cylindrical surface portions 18 and the rolling surface of the ball 5 are made to have the substantially same value, so that the cage 6 is prevented from being displaced in an axial direction while the lubricant can be optimally taken into the pocket 8.

Figure 3:
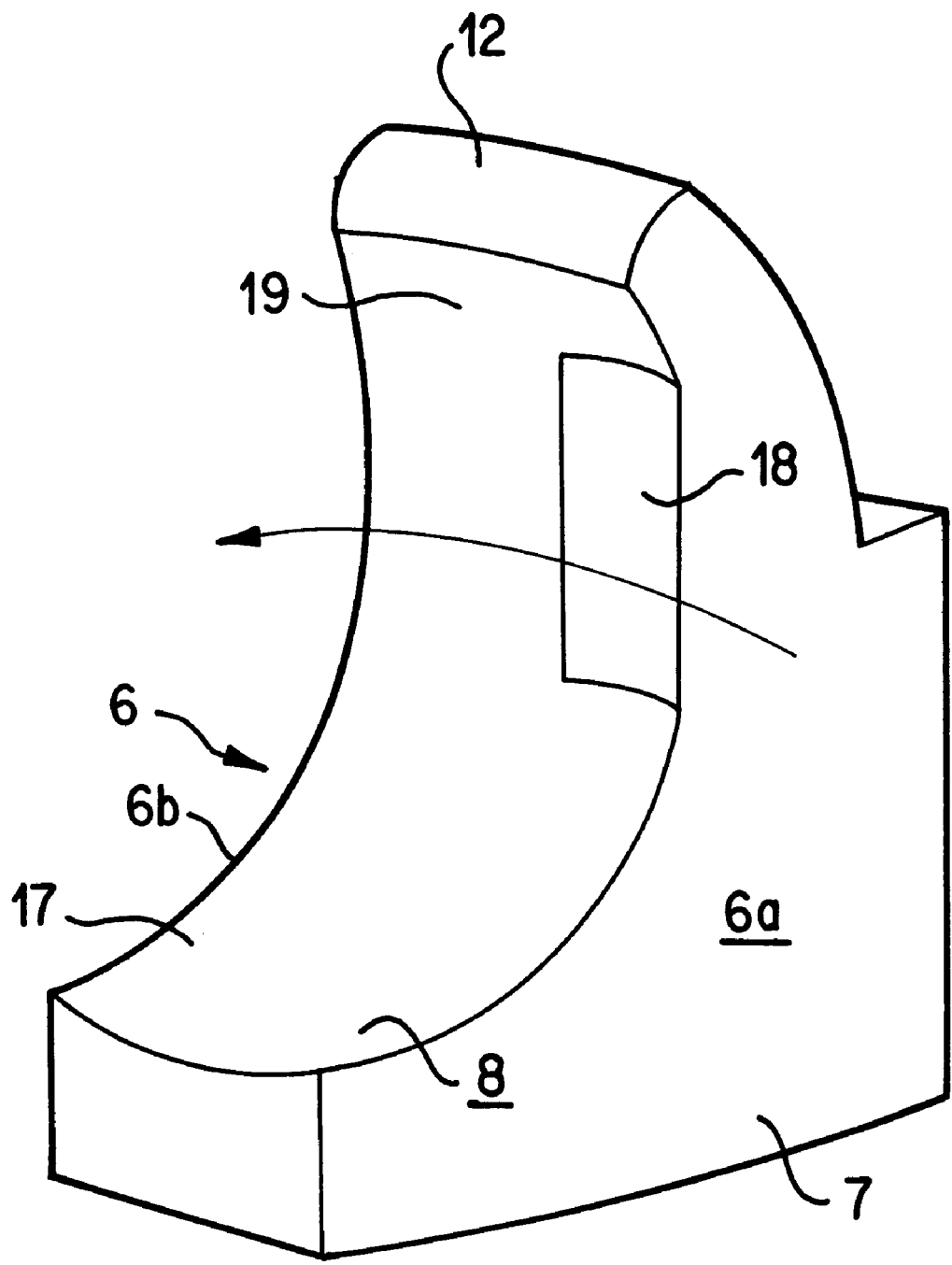
FIG. 3 is an enlarged perspective partial view of a portion of the cage in another example of the embodiments according to the present invention.

FIG. 3 illustrates a second example of the embodiments of the present invention.

As clear in the first example as mentioned above, the axial cylindrical surface portions 18 are formed on the inner surface of the pocket 8 in order to sufficiently scrape the lubricant attached to the track portion in the rolling surface of the ball 5 while the lubricant attached to a surface portion displaced from the track portion is not so scraped. Accordingly, in the case of the cage 6 which is installed in the radial ball bearing where the rolling direction (the direction of the relative rotation of the outer and inner rings) of the ball 5 held in the pocket 8 is fixed, the axial cylindrical surface portions 18 on part of the inner surface of the pocket 8 are not necessarily formed across the whole width (see the direction of the arrow in FIG. 3) of the pocket 8 between the radially inner peripheral surface 6b and the radially outer peripheral surface 6a of the cage 6.

In the second example of FIG. 3, taking into consideration what is mentioned above, only one widthwise half portion of the pocket 8 is provided with an axial cylindrical surface portion 18. Specifically in the case of the present example, one widthwise portion of the pocket 8 on one circumferential side portion 7, more specifically the radially outer half portion closer to the radially outer peripheral surface 6a of the main portion 7, is formed with the axial cylindrical surface portion 18. In this example, the ball 5 held in the pocket 8 is rotated in a direction as shown by an arrow. Accordingly, it is possible with respect to the lubricant attached to the ball 5, that the lubricant attached to the track portion of the ball 5 is sufficiently scraped out, and the lubricant attached to a portion away from the track portion of the ball 5 is not well scraped out. Accordingly, although omitted from the drawings, on the circumferential other side portion of the main portion 7 opposed to the circumferential side portion illustrated in FIG. 3, it is desirable that the axial cylindrical surface portion 18 is formed on the radially inner half portion closer to the radially inner peripheral surface 6b of the main portion 7.

If the lubrication requirements etc. are not so severe, the axial cylindrical surface portion 18 can be formed in either of the circumferential side portions of the main portion 7 on the same side with respect to the diametrical direction of the main portion 7. By controlling the position of the center of the curvature of the spherical concave surface portions 17, 19 and the axial cylindrical surface portions 18, as well as the radius of curvature of the spherical concave surface portions 17, 19, the amount of the lubricant taken in the pocket 8 can be optimized while preventing the cage 6 from being displaced in an axial direction, which is achieved in the same manner as in the first example.

In a modification of the first example, the pocket 8 can be formed at its circumferentially central portion with a radial cylindrical surface portion, in stead of the spherical cylindrical surface portion 17, the central axis of which is placed in a radial direction of the main portion 7.

In addition, the inner surface of the resilient projections 12 can be formed with a conical concave surface portions, instead of the second spherical cylindrical surface portion 19, the central axis of which is placed in the rolling central axis α as in the axial cylindrical surface portions 18.

In working the present invention, by installing the cage 6 in a radial ball bearing with a small diameter like a miniature bearing, a great effect is obtained. Accordingly, the present invention is generally worked in the crown type cage made of synthetic resin, which is generally used as a cage for the radial ball bearing with a small diameter. However, the present invention can be worked in the wave shape or corrugated cage made of a metallic plate as shown in FIGS. 6 and 8, with a certain degree of effects. It should be noted that the application to such wave shape or corrugated cage is also covered by the present invention.

Figure 4A:
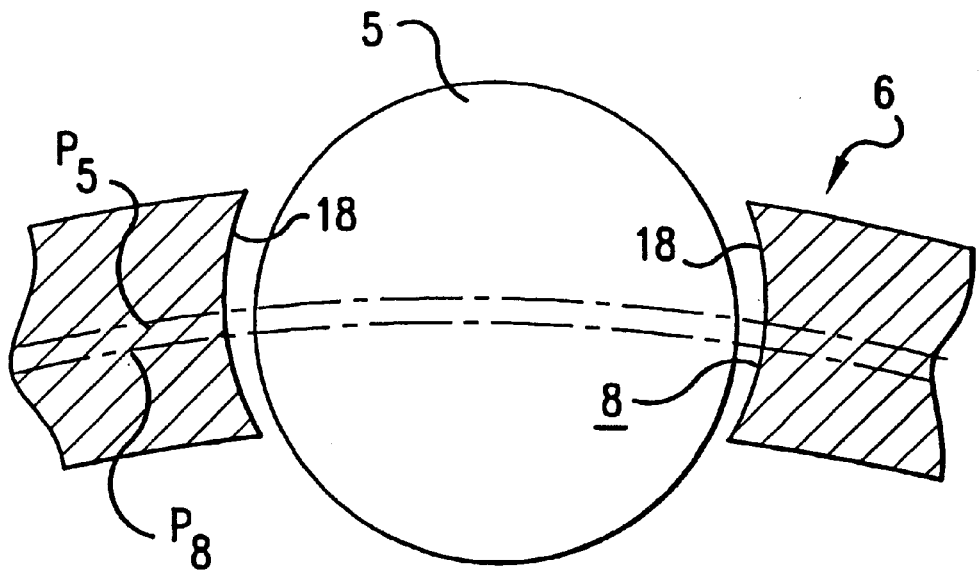
FIGS. 4A and 4B are views taken along the line IV—IV in FIG. 1 to show modified examples in working the present invention where a ball is held in the pocket.

In putting the present invention down to practice, the pitch circle diameter of the pocket 8 (the diameter of the cylindrical surface connecting the central axes of the curvatures of the axial cylindrical surfaces 18) is not necessarily the same to the pitch circle diameter of the ball 5. For example, as shown in FIG. 4A, the pitch circle $P_8$ of the pocket 8 can be located on the radially outer side of the pitch circle $P_5$ of the ball 5. By displacing the pitch circles $P_8$ and $P_5$ from each other, the distance between the peripheral edge portions along the openings of the axial cylindrical surfaces 18 and the rolling surface of the ball 5 is larger on the outer diameter side of the cage 6 and smaller on the Inner diameter side.

By controlling the scraping effects on lubricant of the peripheral edge portion along the openings of the axial cylindrical surfaces 18 to adjust the feeding amount of the lubricant to the pocket 8, the cage noise and the torque of the radial ball bearing are reduced.

Figure 4B:
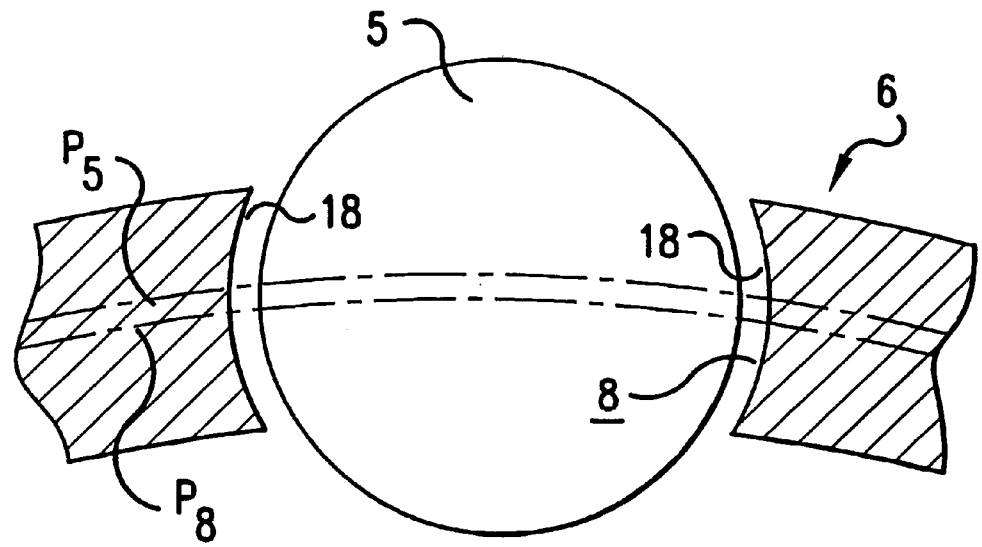

Incidentally, as shown in FIG. 4B, the size relation between the pitch circles $P_8$ and $P_5$ can be reversed with respect to that of FIG. 4A.

EXAMPLE

The experiments the inventors conducted to confirm the effects of the present invention are explained as follows; The experiments are conducted by providing a radial ball bearing having a cage 6 according to the present invention installed therein and a radial ball bearing having a cage 6 according to a prior art structure installed therein, rotating the inner ring with the outer ring fixed in the both ball bearings, and measuring the torque required for the rotation.

The cage 6 according to the present invention had a pocket 8 as shown in FIG. 1 while the cage 6 according to the prior art structure had a pocket 8 having a single spherical concave surface for the inner surface as shown in FIG. 7. The cages 6 were made of a fiber glass reinforced plastic with 10 volume percent of fiber glass mixed in the polyamide 66. The cages 6 had an inner diameter of 6.7 mm, an outer diameter of 8.7 mm and axial height of 1.73 mm.

For the radial bearing for installing the cages 6 therein, a miniature bearing of inner diameter 0:5 mm, outer diameter 0:11 mm and width 0:4 mm, nominal number: MR115B is used. The lubricant was an ester based, rust preventive lubricant oil and coated by oil plating.

The same conditions were applied to the bearings except for the inner surface shape of the pockets 8.

In the state where a preload of 1.5 kgf was applied to the two kinds of radial bell bearings with only the inner surface of the pocket 8 of the cage 6 being changed in shape, the inner ring was rotated at the speed of 5,400 rpm and the torque required to the rotation was measured. The results as shown in FIGS. 5(A) and 5(B) were obtained.

FIGS. 5(A) and 5(B) show two kinds of graphs, where the graph of 5(A) shows the rotating torque of the radial ball bearing having the cage 6 of the present invention while the graph of 5(B) shows the rotating torque of the radial ball bearing having the cage 6 of the prior art structure.

It will be clearly understood from FIGS. 5(A) and 5(B) showing the results of experiments that it takes a long time for the radial ball bearing having the cage 6 of the present invention installed therein to have its rotating torque stabilized, but that the absolute value and variation width of the torque after stabilization can be made small, and on the other hand, that it takes a short time for the radial ball bearing having the conventional cage 6 installed therein to have its rotating torque stabilized, but that the absolute value and variation width of the torque after stabilization are large.

The problem with respect to the time to reach the stabilized rotating torque is related only to the period after the installation of the radial ball bearing until or just after the first run is started, and is practically not serious. What is practically important are small absolute value and small variation width of the stabilized torque. Particularly, the axial cylindrical surface portion 18 formed only in part of the pocket 8 in the widthwise direction as shown in FIG. 3, is provided on either side circumferential side of the pocket 8 and on the same radial side of the pocket 8 with reference to the diametrical direction of the main portion 7, the amount of scraping the lubricant attached to the rolling surface of the ball 5 can be made larger in a certain degree, so that the time for the rotating torque to reach the stabilized state can be made shorter.

Thus, with the cage for the radial ball bearing of the present invention constructed and operated as mentioned above, the life of the radial ball bearing can be secured with the absolute value and variation width of the rotating torque kept small, and the performance of the various devices having the radial ball bearing can be improved.

What is claimed is:

1. A radial ball bearing comprising outer and inner raceways, a plurality of balls rotatably provided between the outer and inner raceways and a cage formed generally in an annular shape and provided with opposite peripheral surfaces and with a plurality of pockets having an opening in the opposite peripheral surfaces and arranged in a circumferential direction of the cage to rotatably hold a plurality of balls each adapted to rotate around a rolling central axis in one of the pockets, each of the pockets having an inner surface which is defined by a pair of axially middle portions opposed to each other, a first spherical concave surface portion connecting the pair of axially middle portions to each other, and second spherical concave surface portions extending from the pair of axially middle portions, respectively, at least one of the axially middle portions being formed with an axially cylindrical surface portion on at least part thereof in an axial middle of the cage, the axially cylindrical surface portion including a peripheral edge portion along the opening on at least one of the peripheral surfaces of the cage, each of the balls having a rolling surface which is, along a track portion, in contact with the outer and inner raceways to provide a distance between the rolling surface and the axial cylindrical surface portions such that the distance is small nearest the track portion and enlarged as the distance is spaced further from the track portion toward the first and second spherical concave surface portions.

2. The radial ball bearing of claim 1, wherein the pockets are arranged to have a first pitch circle diameter while the balls are arranged to have a second pitch circle diameter, and wherein the first pitch circle diameter is the same as the second pitch circle diameter.

3. The radial ball bearing of claim 1, wherein the pockets are arranged to have a first pitch circle diameter while the balls are arranged to have a second pitch circle diameter, and wherein the first pitch circle diameter is different from the second pitch circle diameter.

* * * * *